[12] United States Patent
Mourou et al.

(10) Patent No.: US 8,798,108 B2
(45) Date of Patent: Aug. 5, 2014

(54) DEVICE FOR GENERATING A SHORT DURATION LASER PULSE

(75) Inventors: Gérard Mourou, Paris (FR); Gilles Cheriaux, Fresnes (FR); Christophe Radier, Les Ulis (FR)

(73) Assignee: Ecole Polytechnique, Palaiseau Cedex (FR)

( * ) Notice: Subject to any disclaimer, the term of this patent is extended or adjusted under 35 U.S.C. 154(b) by 714 days.

(21) Appl. No.: 13/057,017

(22) PCT Filed: Jul. 31, 2009

(86) PCT No.: PCT/FR2009/000968
§ 371 (c)(1),
(2), (4) Date: Aug. 23, 2011

(87) PCT Pub. No.: WO2010/012914
PCT Pub. Date: Feb. 4, 2010

(65) Prior Publication Data
US 2011/0299152 A1 Dec. 8, 2011

(30) Foreign Application Priority Data
Aug. 1, 2008 (FR) ...................................... 08 55324

(51) Int. Cl.
*H01S 3/10* (2006.01)
(52) U.S. Cl.
USPC .............................. 372/25; 372/21; 359/337.5
(58) Field of Classification Search
None
See application file for complete search history.

(56) References Cited

U.S. PATENT DOCUMENTS

| | | | |
|---|---|---|---|
| 6,141,362 A | 10/2000 | Meyerhofer et al. | |
| 2002/0018288 A1 | 2/2002 | Rieger et al. | |
| 2008/0159346 A1* | 7/2008 | Brennan et al. | ................. 372/25 |
| 2009/0128892 A1* | 5/2009 | Wise et al. | ................. 359/341.1 |
| 2009/0257464 A1* | 10/2009 | Dantus et al. | ................. 372/25 |
| 2010/0309545 A1* | 12/2010 | Zaouter et al. | ............. 359/337.5 |
| 2011/0242646 A1* | 10/2011 | Schimpf et al. | ............ 359/337.5 |
| 2012/0050843 A1* | 3/2012 | Limpert et al. | ............ 359/337.5 |

OTHER PUBLICATIONS

International Search Report for International Application No. PCT/FR2009/000968, European Patent Office, Nov. 27, 2009, pp. 6.
H. Schenkel, J. Biegert, U. Keller, C. Vozzi, M. Nisoli, G. Sansone, S. Stagira, S. De Silvestri, and O. Svelto, "Generation of 3.8-fs pulses from adaptive compression of a cascaded hollow fiber supercontinuum", Optics Letters, Oct. 15, 2003, vol. 28, No. 20, pp. 1987-1989.

(Continued)

*Primary Examiner* — Hemang Sanghavi
(74) *Attorney, Agent, or Firm* — Graybeal Jackson LLP

(57) ABSTRACT

An embodiment relates to a device for generating a short duration laser pulse, which comprises: means for generating a laser beam and for filtering same, arranged in such a way as to generate an input laser beam providing an input laser pulse; a transparent slide comprising a non-linear scattering material; the laser generation means being arranged so that the slide widens the spectrum of the input laser pulse by phase self-modulation in order to generate a wide-spectrum laser pulse; compression means adapted for compressing the wide-spectrum laser pulse in order to generate a short duration laser pulse; wherein the laser generation means are arranged so that the input beam is spatially uniform on the transparent slide and has a break integral B lower than three when the input beam passes through the transparent slide.

14 Claims, 8 Drawing Sheets

(56) References Cited

OTHER PUBLICATIONS

E. Mevel, O. Tcherbakoff, F. Salin, and E. Constant, "Extracavity compression technique for high-energy femtosecond pulses", J. Optical Society of America B, vol. 20, No. 1, Jan. 2003, pp. 105-108.
E. Mevel, O. Tcherbakoff, F. Salin, and E. Constant, "Extracavity compression technique for high-energy femtosecond pulses", J. Optical Society of America B, vol. 20, No. 1, Jan. 2003, pp. 105-108, XP-002518721.
Denis Villate, Nathalie Blanchot and Claude Rouyer, "Beam breakup integral measurement on high-power laser chains", Optics Letters, vol. 32, No. 5, Mar. 1, 2007, pp. 524-526, XP-002518722.
L. Shah, Z. Liu, I. Hartl, G. Imeshev, G.C. Cho and M.E. Fermann, "Ultrafast high energy amplifiers beyond the B-integral limit", Proc. of SPIE vol. 6102, 2006, pp. 610202•1-610202•5.
M. Sentis, O. Uteza: "Lasers et Technologies Femtosecondes"• 2005. Universite De Saint-Etienne (U. Jean-Monnet). France. Saint-Etienne. France • XP002518724, Google Book Search http://books.google.de/books?id=Ffw8bQbpoosC&hl=en, pp. 38-39, 42-43.

* cited by examiner

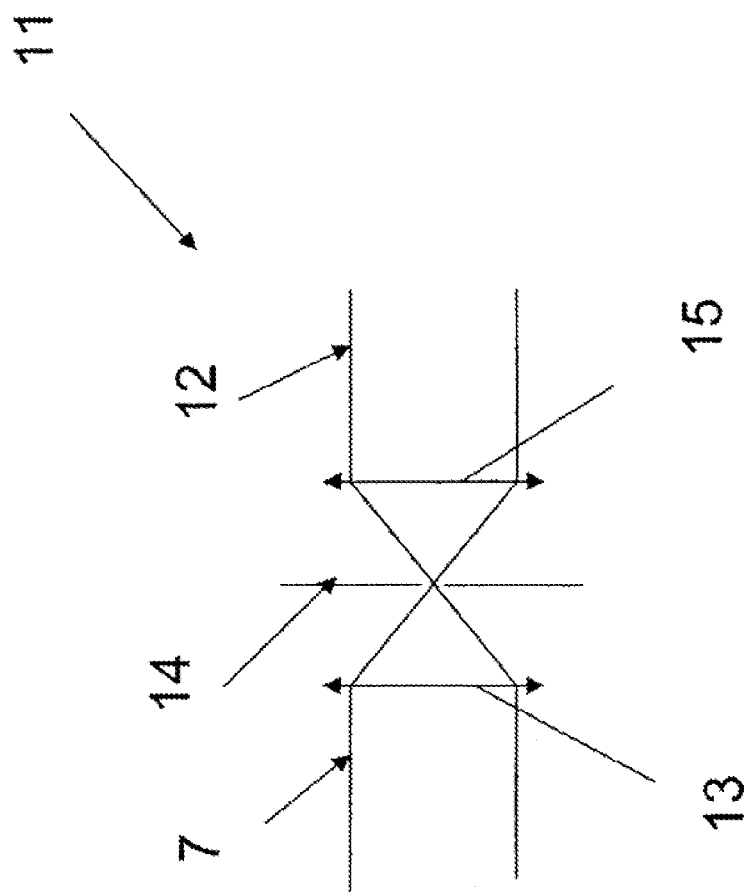

(12)

DEVICE FOR GENERATING A SHORT DURATION LASER PULSE

PRIORITY CLAIM

The present application is a national phase application filed pursuant to 35 USC §371 of International Patent Application Serial No. PCT/FR2009/00968, filed Jul. 31, 2009; which further claims the benefit of French Patent Application Serial No. 0855324 filed Aug. 1, 2008; all of the foregoing applications are incorporated herein by reference in their entireties

TECHNICAL FIELD

An embodiment relates to a device for generating a short duration laser pulse.

In an embodiment, the short duration laser pulse is obtained by reducing the duration of an input pulse An embodiment provides such a device for generating a short duration laser pulse by allowing the use of a high-energy input laser pulse, typically higher than one joule, and of short duration, typically a few femtoseconds.

BACKGROUND

Conventional devices for generating a short duration laser pulse, wherein the input laser pulse is injected into optical fibers with non-linear effect to widen the spectrum of the input laser pulse, such as those described in the publication by Schenkel et al., "Generation of 3.8 fs pulses from adaptive compression of a cascaded hollow fibre supercontinuum", which is incorporated by reference, do not allow the use of high-energy input laser pulses because of damage to the fibers at that level of energy.

SUMMARY

An embodiment relates to a device for generating a free propagation short duration laser pulse, i.e. within an unguided medium.

An embodiment more specifically relates to a device for generating a short duration laser pulse comprising:
  laser generation means arranged in such a way as to generate an input laser beam providing an input laser pulse;
  a transparent slide comprising a non-linear scattering material.
  laser generation means arranged so that the slide of non-linear material widens the spectrum of the input laser pulse by phase self-modulation in order to generate a wide-spectrum laser pulse;
  compression means arranged to compress the wide-spectrum laser pulse in such a way as to generate the short duration laser pulse.

It has been observed that the phase self-modulation effect was obtained for laser pulse power density levels greater than $10^{11}$ W·cm$^{-2}$.

Such a device is known from the publication by Mével et al., "Extra-cavity compression technique for high-energy femtosecond pulses", which is incorporated by reference, and which also aims at allowing the use of high-energy input laser pulses, typically over one joule and of short duration, typically a few femtoseconds.

In the publication by Mével et al., the phase self-modulation enabling the widening of the input pulse spectrum is achieved within an unguided medium thanks to a slide of non-linear material BK7, onto which the input laser beam is injected. A wide spectrum comprising new frequencies is then obtained when leaving the slide. In fact, for power densities greater than $10^{11}$ W/cm$^2$ in the beam received by the slide, a phase self-modulation effect occurs in the non-linear material slide.

Chirped mirrors, i.e. controlled scattering mirrors, then help compress this wide pulse to generate the short pulse.

In the publication by Mével et al., mentioned above, the input laser beam is Gaussian in spatial terms. This beam is focused onto a spatial filter via a lens. The non-linear slide is positioned between the lens and the spatial filter in such a way as to generate wide-spectrum laser pulses.

However, in the publication by Mével et al., mentioned above, the non-linear effects are unequal throughout the beam as a whole, so that the recompression and reduction of duration are heterogeneous and therefore imperfect.

Furthermore, in the above-mentioned publication, because of the use of a Gaussian spatial distribution, a beam self-focusing effect occurs as the non-linear slide is crossed. This second non-linear self-focusing effect has the effect of spatially degrading the laser beam, thus making it potentially unusable and hazardous for optics, especially in the case of energy beams.

An embodiment improves the quality of reduction of the pulse duration in a device as described above, especially by preserving the optics of the device.

An embodiment may do this because the laser generation means are arranged so that the input beam is spatially uniform on the transparent slide and has a B integral lower than three when passing through the transparent slide.

This means that the non-linear effect and the scattering effect of the slide are uniform right along the beam. The result is that the spectral widening caused by the self-modulation effect is uniform, thus providing uniform reduction of the duration throughout the beam.

The quality of the pulse duration reduction is therefore greatly improved. In particular, it has been observed that an embodiment produces very high-energy pulses when leaving the device, under duration regimes of the order of about ten femtoseconds, thanks to a pulse duration reduction factor or two or three with respect to the input pulse. This reduction factor may be obtained for input pulse energy above 100 joules.

On the contrary, the device described in the publication by Mével, mentioned above, would not allow a spatially uniform beam to be used as in an embodiment. In fact, the converging lens used in Mével's device before the transparent slide does not allow uniform distribution to be obtained on the transparent slide.

We shall now describe some potentially advantageous embodiments.

In addition, it is known that the integral B of a laser beam with a wavelength λ at the crossing point in a direction z of a medium having a thickness I with a non-linear refraction index $n_2(z)$ and a power density $I(z)$ is defined as follows:

$$\text{Integral } B = \frac{2\pi}{\lambda} \int_0^I n_2(z) \cdot I(z) dz$$

The value of the integral B is significant for a high-energy laser beam, since, for these beams, the intensity is such that non-linear effects accumulate all the more as and when the pulse advances within the slide.

For an integral B value lower than 3, it has been observed that the spatial distortion was more or less negligible. In fact, when the uniform, i.e. notch input beam, is noisy, the noise has high spatial frequencies. On entering the transparent slide, amplification proportional to an exponential of the integral B is produced depending on the frequency. The spatial distortion of the beam then begins to be significant for integral B values above 3.

The pulse duration compression factor obtained through an embodiment is then of the order of the integral B value. Specifically, it is equal to that integral B value in the ideal case of a pulse that is temporarily Gaussian.

An embodiment as here above, wherein the laser generation means are arranged so that the input beam has an integral B between two and three when it passes through the transparent slide.

For example, the laser generation means may be arranged so that the input beam has an integral B between two and three when it passes through the transparent slide, in order to obtain a pulse duration compression factor substantially between 2 and 3.

The input laser beam may have a power density higher than $10^{11}$ watts per square centimeter on the slide, in order to produce the self-modulation effect within the slide.

The laser beam may be collimated towards the transparent beam in order to avoid loss of uniform spatial distribution of the input laser beam before the slide. Especially, as mentioned above, the use of a lens before the transparent slide would most likely not allow uniform distribution to be maintained on the transparent slide.

The compression means may comprise at least one chirped mirror or a pulse compressor network.

For example, the slide may be a silica slide ($SiO_2$). It has in fact been observed that this material has a good flux resistance level and helps achieve satisfactory performance levels for the device. The slide is transparent to the input laser beam. The slide may also consist of glass.

The laser generation means may comprise a frequency drift amplification laser. This frequency drift amplification laser, commonly known as "chirped pulse amplification" or CPA, produces high energy levels for the input pulse in the femtoseconds domain.

According to an embodiment, the laser generation means may comprise a spatial filter arranged in such a way as to make a laser beam uniform and thus provide, at the exit from the spatial filter, the spatially uniform input laser on the slide. This method of production may be advantageous when the only laser beam available is not uniform, and especially when it does not have sufficient energy. In this case, the spatial filter helps making this laser beam uniform, in such a way as to obtain a spatially uniform input laser transmitted towards the slide.

An embodiment further comprises means so arranged as to re-inject the output beam providing the reduced duration laser pulse to the transparent slide. In this way, it may be possible to make several passages via the transparent slide and, therefore, iterate the effects of the reduction in the device pulse.

In this case, spatial filtration means may be arranged to filter the output beam providing the reduced-duration laser pulse prior to the re-injection thereof into the transparent slide. Such filtering means in particular may make it possible to check that the incident beam on the transparent slide, i.e. the re-injected beam in this case, has an integral B lower than 3.

An embodiment also relates to a system for generating a reduced duration laser pulse comprising an initial device as described above, and a second device as described above, and wherein the output beam from the first device providing the reduced duration laser beam is used to provide the input beam for the second device.

The system may further comprise filtering means, arranged in such a way as to spatially filter the output beam of the first device, in such a way as to generate a filtered beam used as an input beam for the second device. These filtering means also may make it possible to check that the incident beam on the transparent slide of the second device has an integral B lower than 3.

An embodiment also relates to a method for generating a reduced duration laser pulse comprising steps consisting in:
generating an input laser beam providing an input laser pulse.
transmitting the input laser beam to a transparent slide comprising a non-linear scattering material so that the slide widens the spectrum of the input laser pulse through phase self-modulation, so that a wide-spectrum laser pulse is generated.
compressing the wide-spectrum laser pulse in order to generate the short duration laser pulse,
With an embodiment of a method being characterized in that the input laser beam is spatially uniform on the slide.

BRIEF DESCRIPTION OF THE DRAWINGS

We shall now describe one or more embodiments with reference to the attached figures, wherein:

FIG. 8 represents filtering means used in a system containing a chain of devices as described with reference to FIGS. 1 to 6.

DETAILED DESCRIPTION

In the figures, identical numerical references generally relate to technical elements of the same type.

Figure 1:
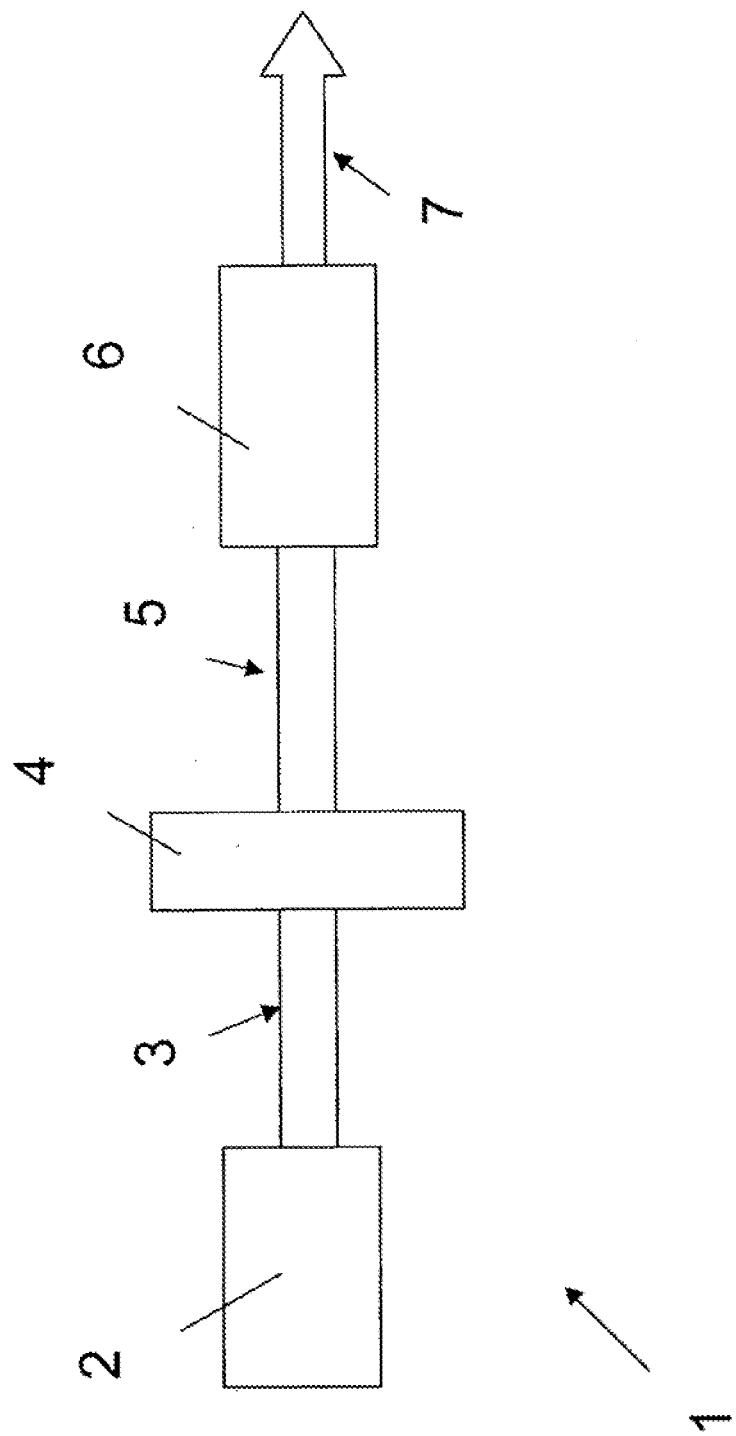
FIG. 1 is a schematic representation of a short duration laser pulse generation device according to an embodiment.

Illustrated in FIG. 1, a device 1 for generating a short duration laser pulse according to an embodiment comprises a femtosecond ultra-intense laser 2. The femtosecond ultra-intense laser 2 may be, for example, a frequency drive amplification laser, also known as a CPA or "chirped pulse amplification" laser. The principle of operation of this CPA laser through time stretching, amplification and recompression is well known.

The laser 2 generates a laser beam 3, which provides a laser pulse known as an input pulse. The duration of the laser pulse is, for example, 30 femtoseconds.

The laser beam 3 is spatially uniform, in other words, it has a notch-shaped spatial form. This notch-shaped form is also known as a "top hat". For a high-energy laser 2, typically above 1 joule, the laser beam 3 exiting from the laser 2 is of uniform spatial amplitude, thus avoiding the need to make a non-uniform beam uniform and therefore lose part of the energy of said beam.

The laser beam 3 is collimated and transmitted to a slide 4 comprising a non-linear material, such as silica ($SiO_2$) or glass. The slide 4 is transparent to the wavelengths within the input beam spectrum.

The laser 2 is such that the laser beam 3 has a power density higher than $10^{11}$ W·cm$^{-2}$ on the slide 4, the power density being defined as the input pulse energy divided by the product of the input beam duration and of the surface area of the laser beam 3 on entry into the slide 4.

For such a power density, the non-linearity of the material in the slide 4 induces a phase self-modulation effect that occurs within the slide 4. This phase self-modulation effect widens the input beam spectrum through the creation of new wavelengths. The beam 5 exiting the slide 4 is therefore an impulse beam with pulses of wider spectrum compared with the input pulse spectrum of the input beam 3.

The input pulse 3 and the wide spectrum pulse 5 are spatially and spectrally represented in greater detail below, with reference to FIGS. 2a to 2d.

The material of which the slide 4 consists is also a scattering agent with positive scattering, which, in addition to the spectral widening of the pulse, generates the extension in time of the pulse through scattering of the pulse group velocities.

The order of magnitude $z_0$ of the thickness of the slide is obtained by the following formulae:

$$z_0 = t^2_0/C$$

Where $t_0$ is the initial duration of the pulse and the magnitude C is given by the following expression:

$$C = \lambda \cdot D(\lambda)/0.322 \cdot \pi^2 \cdot c^2$$

Where $D(\lambda)$ is the scattering within the material according to $\lambda$, the wavelength of the beam and c the velocity under vacuum.

For example:
When $\lambda = 1$ micrometer, we obtain $C = 0.031$ m$^{-1}$·ps$^2$
When $\lambda = 800$ nanometers, we obtain $C = 0.080$ m$^{-1}$·ps$^2$ In practice, the thickness of the slide may also be obtained by simulation through resolution of Schrödinger's non-linear equation.

The input beam 3 has an integral B lower than 3 when it passes through the transparent slide 4. It is known that the integral B of a laser beam of wavelength $\lambda$ when passing in direction z through a medium having a thickness I and a non-linear refraction index $n_2(z)$ and a power density $I(z)$ is defined as follows:

$$\text{Integral } B = \frac{2\pi}{\lambda} \int_0^l n_2(z) \cdot I(z) dz$$

The value of the Integral B is significant for a high-energy laser beam, as for these beams, the intensity is such that non-linear effects accumulate more and more as the pulse advances within the slide. For a value of Integral B lower than 3, it has been observed that the spatial distortion was relatively negligible.

The value of the Integral B may be chosen between two and three in order to obtain a pulse reduction factor between two and three.

The wide-spectrum pulses 5 are then transmitted to a compressor 6 in order to reduce the duration of the pulse. The compressor 6 consists, for example, of chirped mirrors, also known as controlled scattering mirrors, such as those used in CPA lasers. These chirped mirrors may be used in the compressor 6, because of their good damage threshold, efficiency and simplicity.

Networks known as "gratings" may also be used to produce compression.

On exiting the compressor 6, a pulse known as a short duration pulse 7 is obtained. The duration of this pulse is in fact reduced in relation top the input pulse duration 3.

Thanks to this embodiment of a device, a compression factor of a few units, typically two or three, is obtained in order to reduce the duration of the pulse from about thirty femtoseconds, for example, to about ten femtoseconds.

This reduction in duration is limited by the spatial distortion of the pulse. For a reduction in pulse duration simply of the order or two or three, one or more disadvantages of this distortion, which may include the significant frequency amplification caused by noise and capable of damaging the materials because of over-intensity, are avoided.

Finally, it is noted that the propagation of pulses is free, i.e. unguided within the device 1 according to an embodiment. This means that the energy of the pulses used is not limited by restrictions relating to guiding, especially through optical fibers. An embodiment, therefore, provides a very beneficial alternative to the conventional spectral widening provided by non-linear optical fibers, as in the publication by Schenkel et al. mentioned above.

FIGS. 2a to 2d are schematic representations of the input pulse 3 and the wide-spectrum pulse 5.

Figure 2A:
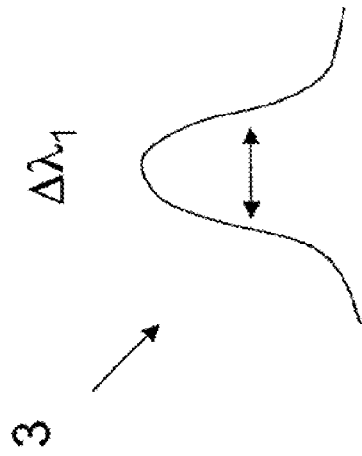
FIGS. 2a to 2d represent the spatial and spectral profile of the input laser pulse and the wide-spectrum laser pulse within a device according to an embodiment.

FIG. 2a represents the spatial distribution of the input beam 3. As illustrated in FIG. 2a, the input beam 3 is spatially uniform, that is, it forms a notch-shaped profile on the diameter d of the beam. According to an embodiment, this beam 3, spatially uniform across its diameter, is transmitted onto the slide 4.

Figure 2B:
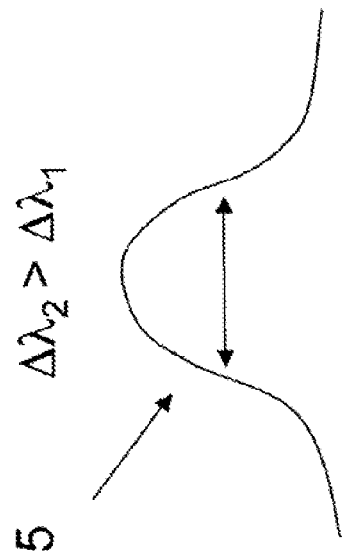
Figure 2C:
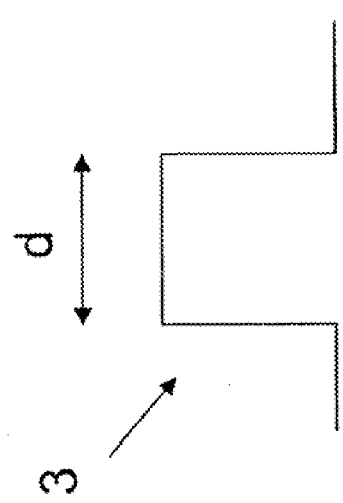

FIG. 2c represents the spatial distribution of the wide-spectrum impulse beam 5 exiting the slide 4. As illustrated in FIG. 2c, the beam 5 is also spatially uniform, i.e. is, it has a profile in the form of a notch across the diameter d of the beam.

Figure 2D:
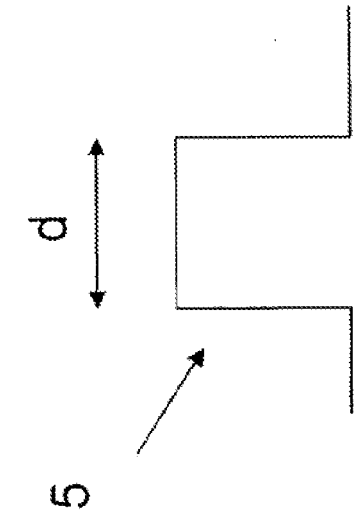

FIG. 2b represents the spectral distribution of the input impulse beam 3. The spectral width of the pulse is $\Delta\lambda_1$. FIG. 2d represents the spectral distribution of the wide-spectrum impulse beam 5. The spectral width of the wide-spectrum beam is $\Delta\lambda_2$, which is greater than $\Delta\lambda_1$, because of the self-modulation effect in the non-linear material previously described.

Figure 3:
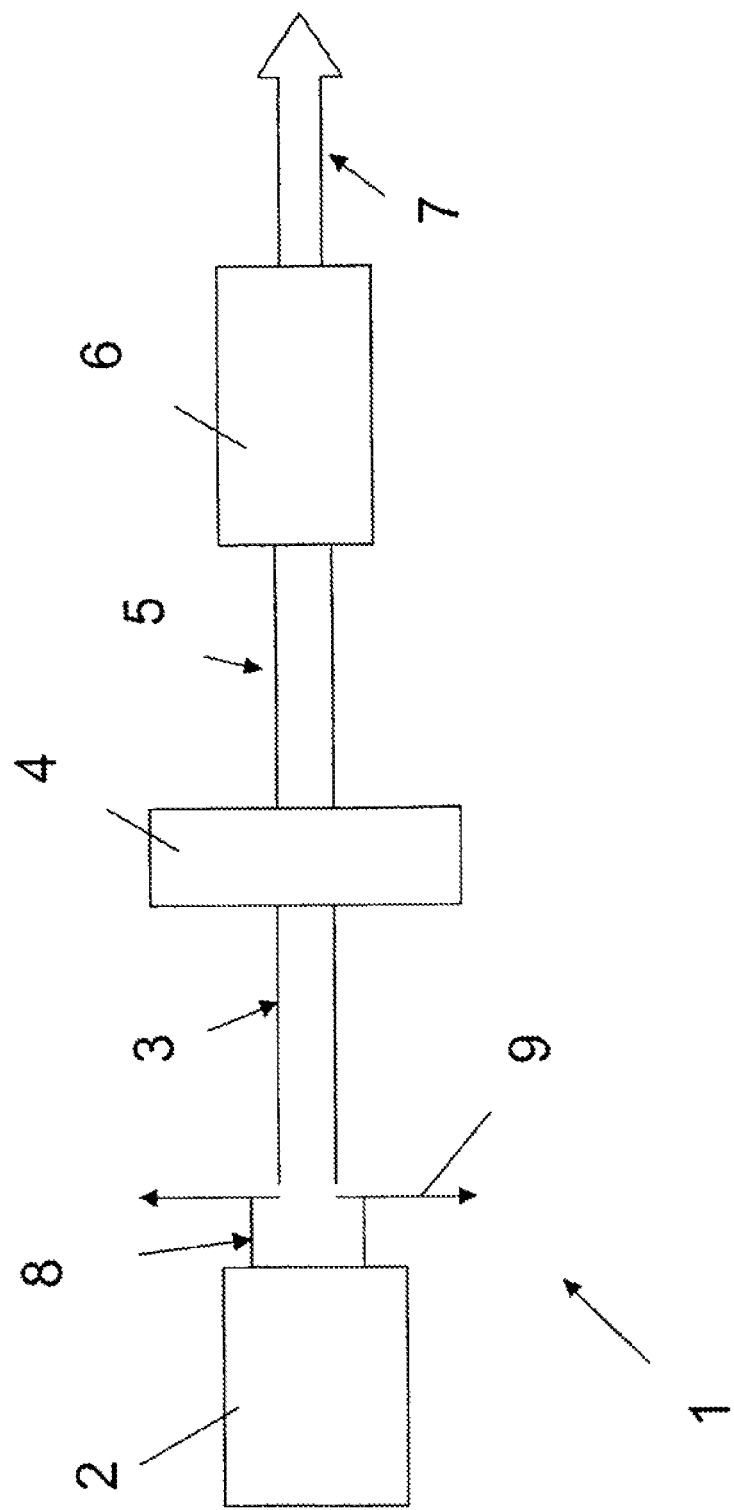
FIG. 3 is a schematic representation of a device for generating a short duration laser pulse according to an embodiment.

We shall now describe another embodiment with reference to FIG. 3.

In FIG. 3, an embodiment of the device 1 for generating a short duration laser pulse comprises a CPA2-type laser, which emits a laser beam 8 at a frequency of 100 Hz. After compression, the pulse associated with this beam has an energy level of 13 millijoules, a spectral width of 19 nanometers, and a duration of 55 femtoseconds limited by phase error (1.3 times the Fourier limit). The device 1 also contains a spatial filter 9 consisting of a diaphragm 9 of 11 millimeters in diameter. The beam 8 is transmitted through the diaphragm 9.

The spatial filter 9 is intended to select the spatially uniform central part of the beam 8, in order to generate a spatially uniform input laser beam 3. In fact, the energy of the laser beam 8 (13 millijoules as mentioned above) is not sufficient within this method of realization to obtain a spatially uniform beam directly.

On exiting the diaphragm 9, the input beam 3 is spatially uniform and has an energy level of 9 millijoules, for a power density of about 0.17 terawatts per square centimeter (0.17 TW·cm$^{-2}$).

The input beam 3 is collimated towards a silica (SiO$_2$) slide 4, 22 millimeters thick, which acts as an unguided non-linear medium to generate a wide-spectrum pulse 5.

Twenty percent of the energy of the beam 5 is then transmitted to a line of silica (SiO$_2$) compression prisms 6 in order to compress the wide-spectrum pulse 5 and thus obtain a short duration pulse 7 on exit from the compressor 6.

Figure 4:
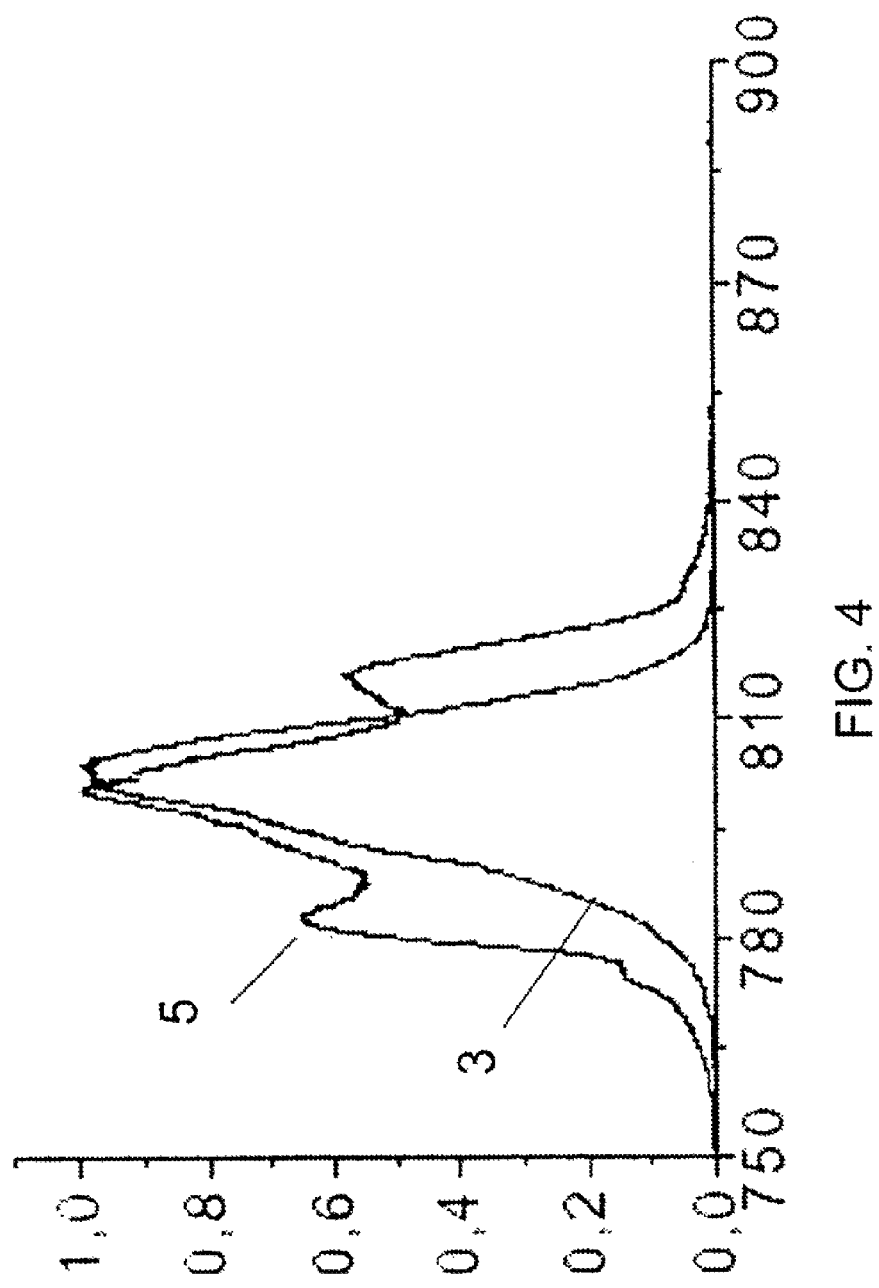
FIG. 4 represents the wavelength distribution of an input pulse and a wide-spectrum pulse according to an embodiment.

FIG. 4 illustrates the standardized spectral distribution according to the wavelength in nanometers, for the input pulse 3 and the wide-spectrum pulse 5. This figure shows the new wavelengths created through the self-nodulation effect, caused in turn by the non-linearity in the silica slide 4. The input pulse spectrum 3 has a mid-height width of 19 nanometers, while the wide-spectrum pulse spectrum has a mid-height width of 38 nanometers.

Figure 5:
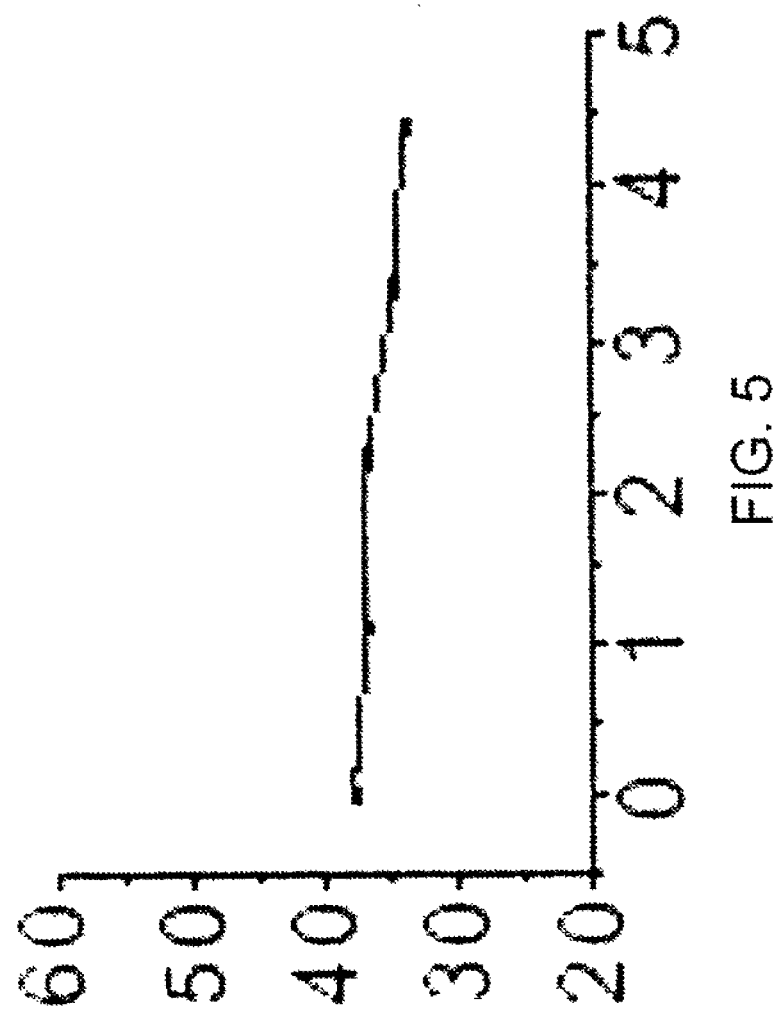
FIG. 5 represents the mid-height spectral width of a wide-spectrum pulse within a device according to an embodiment.

FIG. 5 represents the mid-height spectral width of the wide-spectrum pulse 5 according to the distance to the center of the impulse beam 5. This figure shows the good spatial uniformity of the spectral widening effect for the whole beam.

Figure 6:
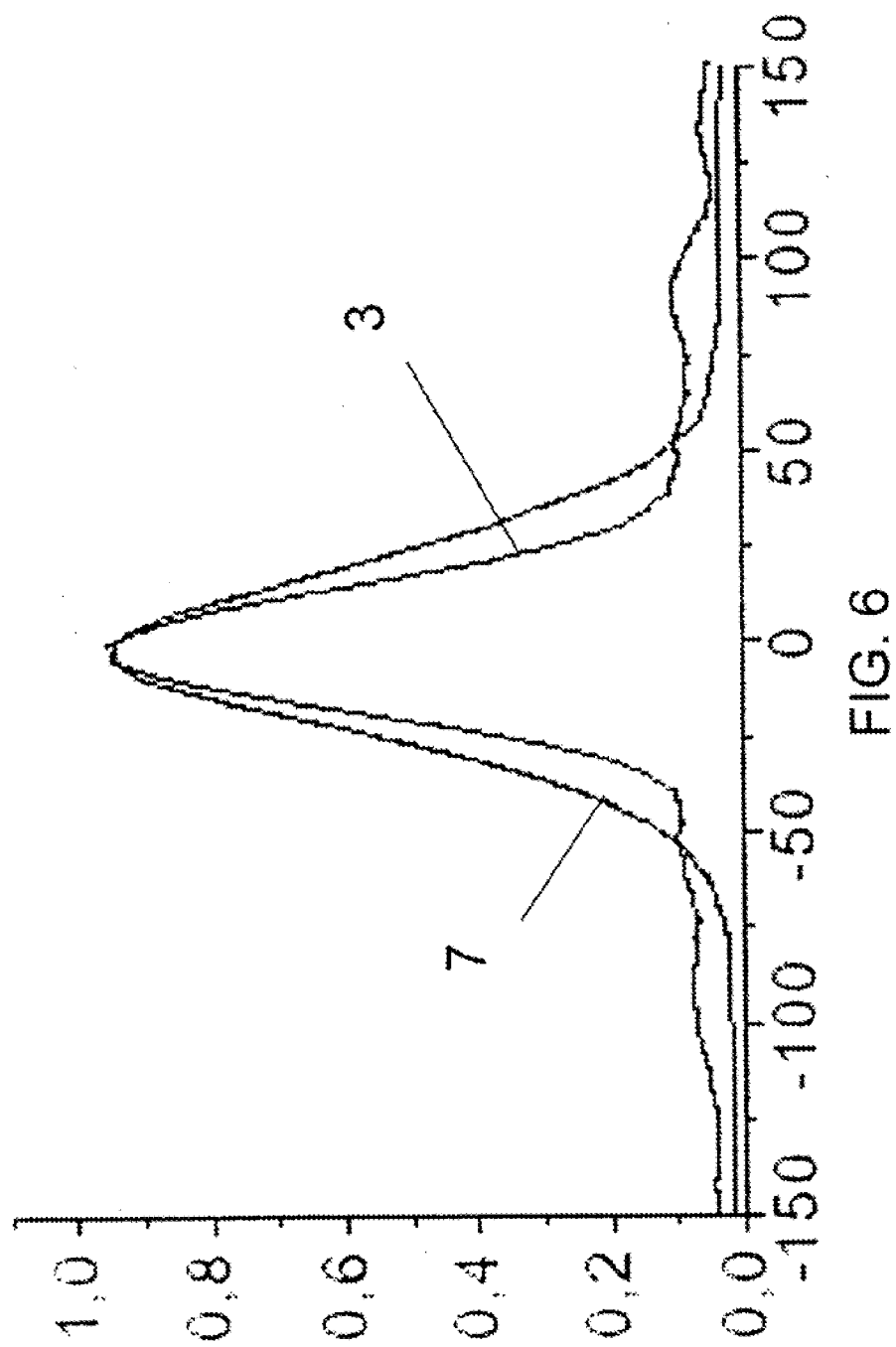
FIG. 6 represents the duration of an input pulse and a short duration input pulse within a device according to an embodiment.

FIG. 6 shows a standardized representation of the input pulse 3 and the short duration pulse 7, that is, the pulse obtained on exit from the compressor 6 vs time, in femtoseconds.

In this figure, the mid-height duration of the input pulse is 55 femtoseconds, while the mid-height duration of the short duration pulse is 33 femtoseconds.

The result is a good reduction in the pulse duration for a relatively high input energy.

The device 1 according to an embodiment may be used with intense lasers of the order of one hundred joules. For these lasers, a pulse duration of the order of 15 femtoseconds may be obtained on exit from the device 1.

Figure 7:
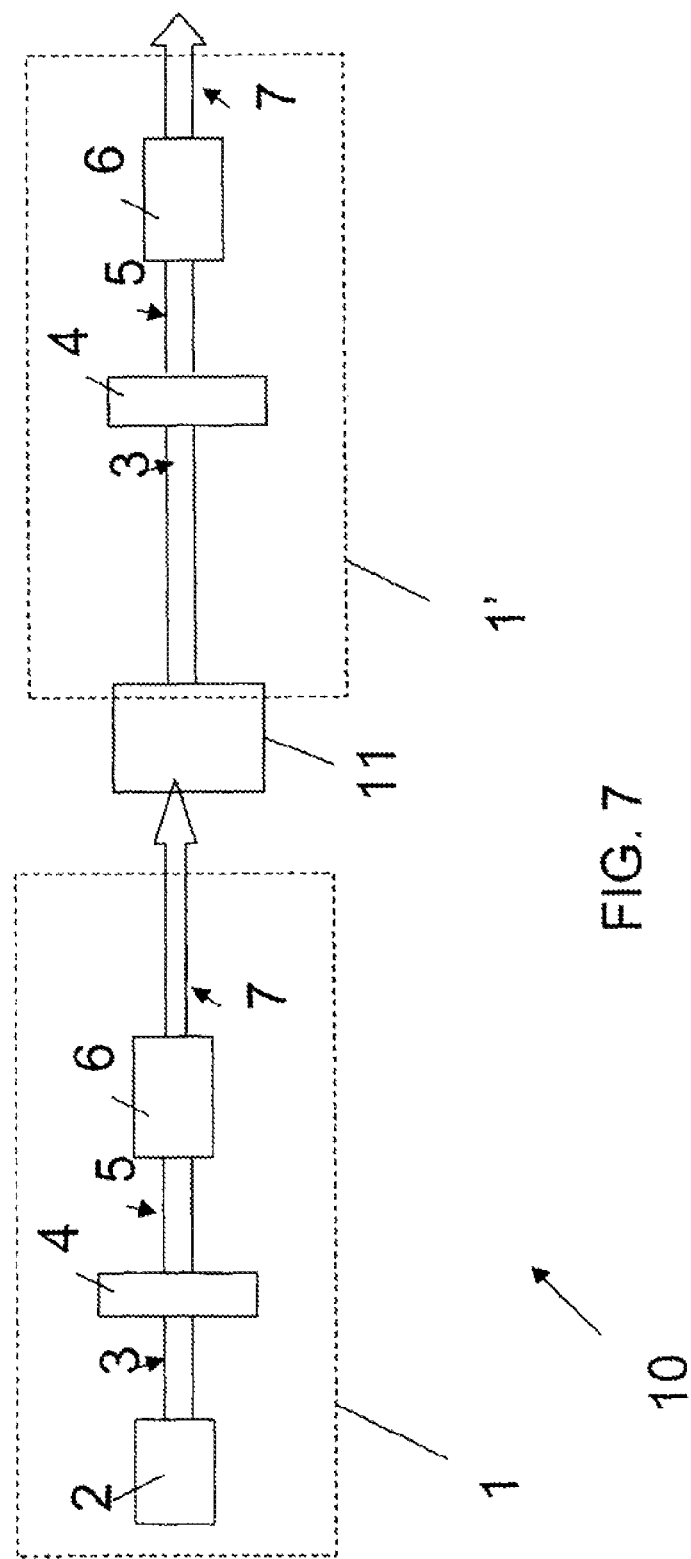
FIG. 7 represents a system that contains a chain of devices as described with reference to FIGS. 1 to 6.

As illustrated in FIG. 7, according to an embodiment, a system 10 comprises a device 1 as described previously, generating a short duration pulse beam 7 on exit. The system also contains means 11 for spatial filtration of the beam 7 in order to generate a filtered beam 12.

These filtering means 11 are described in greater detail in FIG. 8 and comprise, for example, a first lens 13 that concentrates the beam in a diaphragm 14 and a second lens 15 to re-collimate the filtered beam 12.

The filtered beam 12 is then used as an input beam into a device 1' for generating a short duration laser pulse as described previously with reference to FIGS. 1-6.

More generally, a number of devices for generating a short duration laser pulse, as described previously with reference to FIGS. 1-6, may be used in a cascade system in order to obtain an even shorter pulse duration on exit from the system.

Between the various devices within the cascade system, it may be preferable to position means 11 of filtering the output beam spatially and generating a filtered beam 12 used as an input beam for the next device, so that this input beam has an integral B lower than 3.

In fact, when these filtering means are absent, it has been observed that the output beam from the first device according to an embodiment could have too high an integral B to be directly injected into a transparent slide.

Through this cascade, it may be possible for example to obtain a reduction in the pulse duration for a new factor, with two devices in cascade and filtering means 11, as previously described, between these devices.

The cascade system may be used in transmission, but also in reflection, through use of mirrors. This type of reflection allows the output beam to be re-injected into the transparent slide 4, which, significantly, allows the same transparent slide 4 to be used for several beam passages. This embodiment allows the device to be made more compact.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A device for generating a short duration laser pulse, which comprises:
    means for generating a laser beam arranged in such a way as to generate an input laser beam providing an input laser pulse
    a transparent slide comprising a non-linear scattering material
    the laser generation means being arranged so that the slide widens the spectrum of the input laser beam by phase self-modulation, in order to generate a wide-spectrum laser pulse
    compression means adapted for compressing the wide-spectrum laser pulse in order to generate a short duration laser pulse
    wherein the laser generation means are arranged so that the input beam is spatially uniform on the transparent slide and has an Integral B lower than three when the input beam passes through the transparent slide, wherein the Integral B is defined by the following equation:

$$\text{Integral } B = \frac{2\pi}{\lambda} \int_0^l n_2(z) \cdot I(z) dz,$$

wherein $\lambda$ is the wavelength of the input beam passing through the transparent slide in direction z, l is the thickness of the transparent slide, $n_2(z)$ is the non-linear refraction index of the transparent slide and $I(z)$ is the power density of the input beam.

2. A device according to claim 1, wherein the laser generation means are arranged so that the input beam has an integral B between two and three when the input beam passes through the transparent slide.

3. A device according to claim 1, wherein the input laser beam has a power density higher than $10^{11}$ watts per square centimeter on the slide.

4. A device according to claim 1, wherein the laser beam is collimated towards the transparent slide.

5. A device according to claim 1, wherein the compression means comprise at least one chirped mirror or a pulse compressor network.

6. A device according to claim 1, wherein the slide is a silica (SiO$_2$) slide.

7. A device according claim 1, wherein the slide is a glass slide.

8. A device according to claim 1, wherein the laser generation means comprise a frequency drift amplification laser.

9. A device according to claim 1, wherein the laser generation means comprise a spatial filter arranged to make the laser beam uniform so as to provide, at the spatial filter output, an input laser beam spatially uniform on the slide.

10. A device according to claim 1, further comprising means arranged in such a way as to re-inject the output beam providing the short duration laser pulse towards the transparent slide.

11. A device according to claim 10, further comprising spatial filtration means arranged in such a way as to filter the output beam providing the short duration laser beam prior to the re-injection thereof into the transparent slide.

12. A system for generating a short duration laser pulse, comprising a first device according to claim 1 and a second device according to claim 1, and wherein the first device output beam providing the short duration laser beam is used to provide the input beam for the second device.

13. A system for generating a short duration laser pulse according to claim 12, further comprising filtering means arranged to spatially filter the output beam from the first device in order to generate a filtered beam used as an input beam for the second device.

14. A method for generating a short duration laser pulse comprising:
generating an input laser beam providing an input laser pulse
transmitting the input laser pulse to a transparent slide comprising a non-linear scattering material so that the slide widens the spectrum of the input laser pulse by phase self-modulation, thus generating a wide-spectrum laser pulse
compressing the wide-spectrum laser pulse in order to generate the short duration laser pulse;
wherein the input laser beam is spatially uniform on the transparent slide and has an Integral B lower than three when passing through the transparent slide, wherein the Integral B is defined by the following equation:

$$\text{Integral } B = \frac{2\pi}{\lambda} \int_0^l n_2(z) \cdot I(z) dz,$$

wherein $\lambda$ is the wavelength of the input beam passing through the transparent slide in direction z, I is the thickness of the transparent slide, $n_2(z)$ is the non-linear refraction index of the transparent slide and $I(z)$ is the power density of the input beam.

* * * * *